United States Patent
Kumar et al.

(10) Patent No.: US 11,777,417 B2
(45) Date of Patent: Oct. 3, 2023

(54) POWER CONVERTER AND CONTROL METHOD THEREOF

(71) Applicant: Delta Electronics, Inc., Taipei (TW)

(72) Inventors: Misha Kumar, Cary, NC (US); Yungtaek Jang, Cary, NC (US)

(73) Assignee: DELTA ELECTRONICS, INC., Taipei (TW)

( * ) Notice: Subject to any disclaimer, the term of this patent is extended or adjusted under 35 U.S.C. 154(b) by 0 days.

(21) Appl. No.: 18/099,238

(22) Filed: Jan. 19, 2023

(65) Prior Publication Data
US 2023/0155517 A1   May 18, 2023

Related U.S. Application Data

(62) Division of application No. 17/035,369, filed on Sep. 28, 2020, now Pat. No. 11,594,976.
(Continued)

(51) Int. Cl.
*H02M 3/335* (2006.01)
*H02M 1/32* (2007.01)
(Continued)

(52) U.S. Cl.
CPC ......... *H02M 3/33592* (2013.01); *H02M 1/32* (2013.01); *H02M 1/40* (2013.01);
(Continued)

(58) Field of Classification Search
CPC ...... H02M 3/33592; H02M 1/32; H02M 1/40; H02M 3/3353; H02M 3/33584;
(Continued)

(56) References Cited

U.S. PATENT DOCUMENTS 6,760,236 B2   7/2004   Hsieh
7,136,293 B2   11/2006  Petkov et al.
(Continued)

FOREIGN PATENT DOCUMENTS

CN   102761267 A   10/2012
CN   104578718 B   10/2017
(Continued)

OTHER PUBLICATIONS

Sharifuddin, N.S. Mohd et al., "Low-load Efficiency Improvement of a Three-Phase Bidirectional Isolated DC-DC Converter (3P-BIDC) via Enhanced Switching Strategy", International Journal of Engineering & Technology, Dec. 31, 2018 (Dec. 31, 2018), pp. 932-938.
(Continued)

*Primary Examiner* — Yusef A Ahmed
(74) *Attorney, Agent, or Firm* — KIRTON McCONKIE; Evan R. Witt

(57) ABSTRACT

A power converter and a control method thereof are provided. The power converter includes a primary side switching circuit, a secondary side switching circuit, a transformer, and a control circuit. The primary side switching circuit includes a first set of switches. The secondary side switching circuit includes a second set of switches. The transformer is coupled between the primary side switching circuit and the secondary side switching circuit. The control circuit is configured to control power transfer between the primary side switching circuit and the secondary side switching circuit by controlling the first and second sets of switches. The control circuit is adapted to enable and disable the first and second sets of switches in an enabling duration and a disabling duration respectively and alternatively.

11 Claims, 10 Drawing Sheets

Related U.S. Application Data

(60) Provisional application No. 63/035,145, filed on Jun. 5, 2020.

(51) Int. Cl.
  *H02M 1/40* (2007.01)
  *H02M 1/00* (2006.01)
  *H02H 7/045* (2006.01)

(52) U.S. Cl.
  CPC ..... *H02M 3/3353* (2013.01); *H02M 3/33584* (2013.01); *H02H 7/0455* (2013.01); *H02M 1/0003* (2021.05); *H02M 1/0041* (2021.05)

(58) Field of Classification Search
  CPC .......... H02M 1/0003; H02M 1/0041; H02H 7/0455; Y02B 70/10
  See application file for complete search history.

(56) References Cited

U.S. PATENT DOCUMENTS

| | | | |
|---|---|---|---|
| 8,456,867 B1 | 6/2013 | Karlsson et al. | |
| 9,190,911 B2* | 11/2015 | Dai | H02M 3/335 |
| 9,496,797 B2 | 11/2016 | Panov et al. | |
| 9,748,855 B2* | 8/2017 | Lee | H02M 3/33592 |
| 9,774,269 B2* | 9/2017 | Matsubara | H02M 3/33584 |
| 10,044,282 B2* | 8/2018 | Jimichi | H02M 3/33515 |
| 10,218,278 B2 | 2/2019 | Tschirhart et al. | |
| 10,333,414 B2* | 6/2019 | Ishikura | H02M 3/33584 |
| 10,439,500 B2* | 10/2019 | Babazadeh | H02M 3/33546 |
| 10,686,386 B2* | 6/2020 | Tschirhart | H02M 3/33592 |
| 11,025,172 B2* | 6/2021 | Zhang | H02M 3/01 |
| 11,444,541 B2* | 9/2022 | Sun | H02M 3/33573 |
| 2010/0246215 A1 | 9/2010 | Mase et al. | |
| 2011/0103097 A1* | 5/2011 | Wang | H02M 3/33592 |
| | | | 363/21.02 |
| 2014/0254203 A1* | 9/2014 | Dai | H02M 3/01 |
| | | | 363/17 |
| 2015/0229225 A1* | 8/2015 | Jang | H02M 3/285 |
| | | | 363/17 |
| 2015/0263634 A1* | 9/2015 | Fu | H02M 3/33573 |
| | | | 363/21.02 |
| 2015/0365005 A1* | 12/2015 | Panov | H02M 3/33584 |
| | | | 307/24 |
| 2016/0043562 A1* | 2/2016 | Lisi | H02J 7/00308 |
| | | | 307/104 |
| 2016/0126844 A1* | 5/2016 | Tschirhart | H02M 3/01 |
| | | | 363/17 |
| 2016/0294294 A1* | 10/2016 | Ye | H02M 3/33592 |
| 2016/0380547 A1* | 12/2016 | Chen | H02M 3/33576 |
| | | | 363/17 |
| 2017/0063251 A1* | 3/2017 | Ye | H02M 3/33576 |
| 2017/0104365 A1* | 4/2017 | Ghosh | H02M 1/4241 |
| 2017/0370977 A1* | 12/2017 | El-Barbari | G01R 15/18 |
| 2018/0102712 A1* | 4/2018 | Torrico-Bascopé | ........... |
| | | | H02M 3/33584 |
| 2019/0288607 A1* | 9/2019 | Zong | H02M 3/33584 |
| 2019/0393769 A1* | 12/2019 | Wei | H02M 3/33592 |
| 2020/0136521 A1 | 4/2020 | Lin | |
| 2020/0382012 A1* | 12/2020 | Ksiazek | H02M 1/083 |
| 2021/0036622 A1* | 2/2021 | Brennan | H02M 3/3376 |
| 2021/0359611 A1* | 11/2021 | Zhou | H02M 1/14 |
| 2022/0045618 A1* | 2/2022 | Kumar | H02J 50/12 |

FOREIGN PATENT DOCUMENTS

| | | |
|---|---|---|
| CN | 107546983 A | 1/2018 |
| JP | 2016220315 A | 12/2016 |
| JP | 2017130997 A | 7/2017 |
| JP | 2019118234 A | 7/2019 |
| TW | M449407 U | 3/2013 |
| TW | 201511457 A | 3/2015 |
| TW | I683513 B | 1/2020 |
| WO | 2017168220 A1 | 10/2017 |
| WO | 2018155080 A1 | 8/2018 |
| WO | 2019187306 A1 | 10/2019 |
| WO | 2020017163 A1 | 1/2020 |

OTHER PUBLICATIONS

Assadi, Seyed Amir et al., "Active Saturation Mitigation in High-Density Dual-Active-Bridge DC-DC Converter for On-Board EV Charger Applications", IEEE Transactions on Power Electronics, Institute of Electrical and Electronics Engineers, USA, vol. 35, No. 4, Sep. 3, 2019 (Sep. 3, 2019), pp. 4376-4387.

* cited by examiner

POWER CONVERTER AND CONTROL METHOD THEREOF

CROSS-REFERENCE TO RELATED APPLICATION

This application is a Divisional Application of U.S. patent application Ser. No. 17/035,369 filed on Sep. 28, 2020 and entitled "POWER CONVERTER AND CONTROL METHOD THEREOF", which claims the benefit of U.S. Provisional Application No. 63/035,145 filed on Jun. 5, 2020, entitled "ISOLATED DC/DC CONVERTER AND CONTROL METHOD THEREOF". The entire contents of the above-mentioned patent applications are incorporated herein by reference for all purposes.

FIELD OF THE INVENTION

The present disclosure relates to a power converter and a control method thereof, and more particularly to a power converter and a control method thereof for preventing transformer saturation in the power converter.

BACKGROUND OF THE INVENTION

Nowadays, isolated DC/DC converters are widely used in many applications where a DC isolation is required between the input and output ports of the converter. To achieve the DC isolation, an isolated DC/DC converter employs a transformer that operates at the switching frequency of the converter. FIG. 1 shows a basic block diagram of a conventional isolated DC/DC converter. As shown in FIG. 1, the isolated DC/DC converter includes a transformer TR, two switching stages located at the primary and secondary sides of the transformer, and an impedance $Z_s$ coupled between the primary switching stage and the transformer. It should be noted that the primary and secondary switching stages can be implemented with one of full-bridge, half-bridge, forward, and flyback circuits. It should also be noted that impedance $Z_s$ corresponds to either an inductor or serially coupled one or more inductors and capacitors. In fact, having a capacitor in series with the transformer helps to prevent saturation of the transformer by blocking the DC current. However, especially in high power applications, it is not practical to use the series DC blocking capacitor since it makes the converter bulky, expensive, and inefficient.

A saturation of a transformer is caused by unequal positive and negative volt-seconds applied across the transformer due to uneven duty-cycles of the switches and/or unequal voltage drops across the devices. It should be noted that the uneven duty-cycles of the switches are caused by the uneven delays of the gate drive signals and/or unequal turn-on and turn-off delays of the switching devices.

To prevent saturation of a transformer, several passive and active approaches have been used in the past. The passive approaches include designing a transformer with a large air gap according to the worst-case flux imbalance or using a series DC blocking capacitor to prevent saturation of the transformer by blocking the DC current. However, these passive approaches are not desirable for modern power supplies since the first approach makes the transformer undesirably large whereas the second approach increases size and cost of the converter. The active approach includes the regulation of the DC value of magnetizing current. The average value of magnetizing current is sensed by using a magnetic flux-density transducer or by calculating the difference between the currents of the primary and secondary sides of the transformer. However, these active approaches are not desirable for cost sensitive applications since the first approach requires an additional auxiliary core with windings whereas the second approach requires two additional current sensors which increase the cost of the converter.

Therefore, there is a need of providing a power converter and a control method thereof to obviate the drawbacks encountered from the prior arts.

SUMMARY OF THE INVENTION

It is an objective of the present disclosure to provide a power converter and a control method thereof to prevent saturation of a transformer in the power converter. The switches of the power converter are enabled and disabled in an enabling duration and a disabling duration respectively and alternatively. Accordingly, a DC magnitude of magnetizing current of the transformer is reset to zero substantially during the disabling duration. Consequently, saturation of the transformer may be prevented without any additional blocking capacitor, sensor, sensing circuit or auxiliary winding.

In accordance with an aspect of the present disclosure, there is provided a power converter including a primary side switching circuit, a secondary side switching circuit, a transformer, and a control circuit. The primary side switching circuit includes a first set of switches. The secondary side switching circuit includes a second set of switches. The transformer is coupled between the primary side switching circuit and the secondary side switching circuit. The control circuit is configured to control power transfer between the primary side switching circuit and the secondary side switching circuit by controlling the first and second sets of switches. The control circuit is adapted to enable and disable the first and second sets of switches in an enabling duration and a disabling duration respectively and alternatively.

In accordance with another aspect of the present disclosure, there is provided a control method of a power converter. The power converter includes a primary side switching circuit, a secondary side switching circuit, and a transformer coupled between the primary side switching circuit and the secondary side switching circuit. The primary side switching circuit includes a first set of switches. The secondary side switching circuit includes a second set of switches. The first and second sets of switches are enabled and disabled in an enabling duration and a disabling duration respectively and alternatively. The control method includes steps of: (a) recording an operation time of the power converter continuously; (b) enabling the first and second sets of switches; (c) determining whether the operation time is smaller than a time of the enabling duration; (d) performing the step (c) again if the determining result of the step (c) is satisfied, and disabling the first and second sets of switches if the determining result of the step (c) is not satisfied; (e) determining whether the operation time is smaller than a sum of the time of the enabling duration and a time of the disabling duration; and (f) performing the step (e) again if the determining result of the step (e) is satisfied, and resetting the operation time to zero and performing the step (a) if the determining result of the step (e) is not satisfied.

In accordance with another aspect of the present disclosure, there is further provided a control method of a power converter. The power converter includes a primary side switching circuit, a secondary side switching circuit, and a transformer coupled between the primary side switching circuit and the secondary side switching circuit. The primary side switching circuit includes a first set of switches. The secondary side switching circuit includes a second set of switches. The first and second sets of switches are enabled and disabled in an enabling duration and a disabling duration respectively and alternatively. The control method includes steps of: (a) providing a counter equal to 1, where the counter represents a number of passed preset cycles; (b) determining whether 1≤counter≤$N_{EN}$, wherein $N_{EN}$ is a number of preset cycles during the enabling duration; (c) enabling the first and second sets of switches for one preset cycle if the determining result of the step (b) is satisfied, and disabling the first and second sets of switches for one preset cycle if the determining result of the step (b) is not satisfied; (d) increasing the counter by 1; (e) determining whether counter>$N_{EN}$+$N_{DIS}$, wherein $N_{DIS}$ is a number of preset cycles during the disabling duration; and (f) resetting the counter to 1 if the determining result of the step (e) is satisfied, and performing the step (b) again.

DETAILED DESCRIPTION OF THE PREFERRED EMBODIMENT

Figure 1:
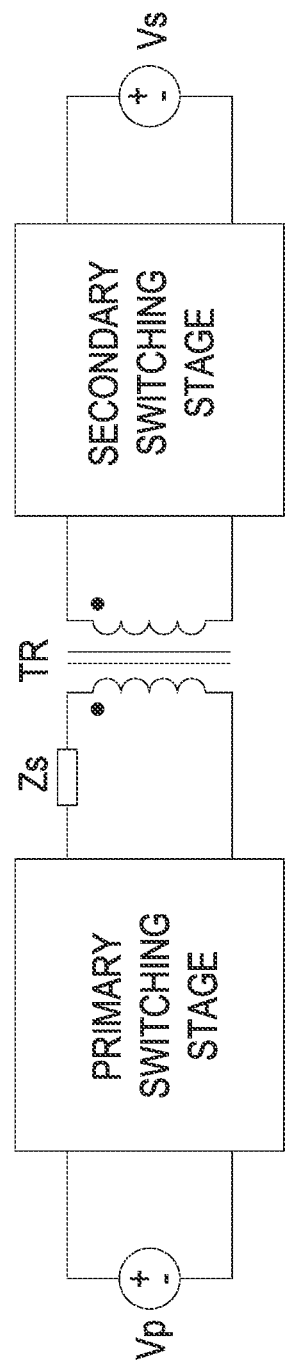
FIG. 1 shows a basic block diagram of a conventional isolated DC/DC converter.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. While the numerical ranges and parameters set forth for the broad scope of the present invention are approximations, the numerical value reported in the specific examples set forth as accurately as possible. However, any numerical values inherently contain certain errors necessarily the standard deviation found in the respective testing measurements caused. Also, as used herein, the term "about" generally means away from a given value or a range of 10%, 5%, 1% or 0.5%. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 2:
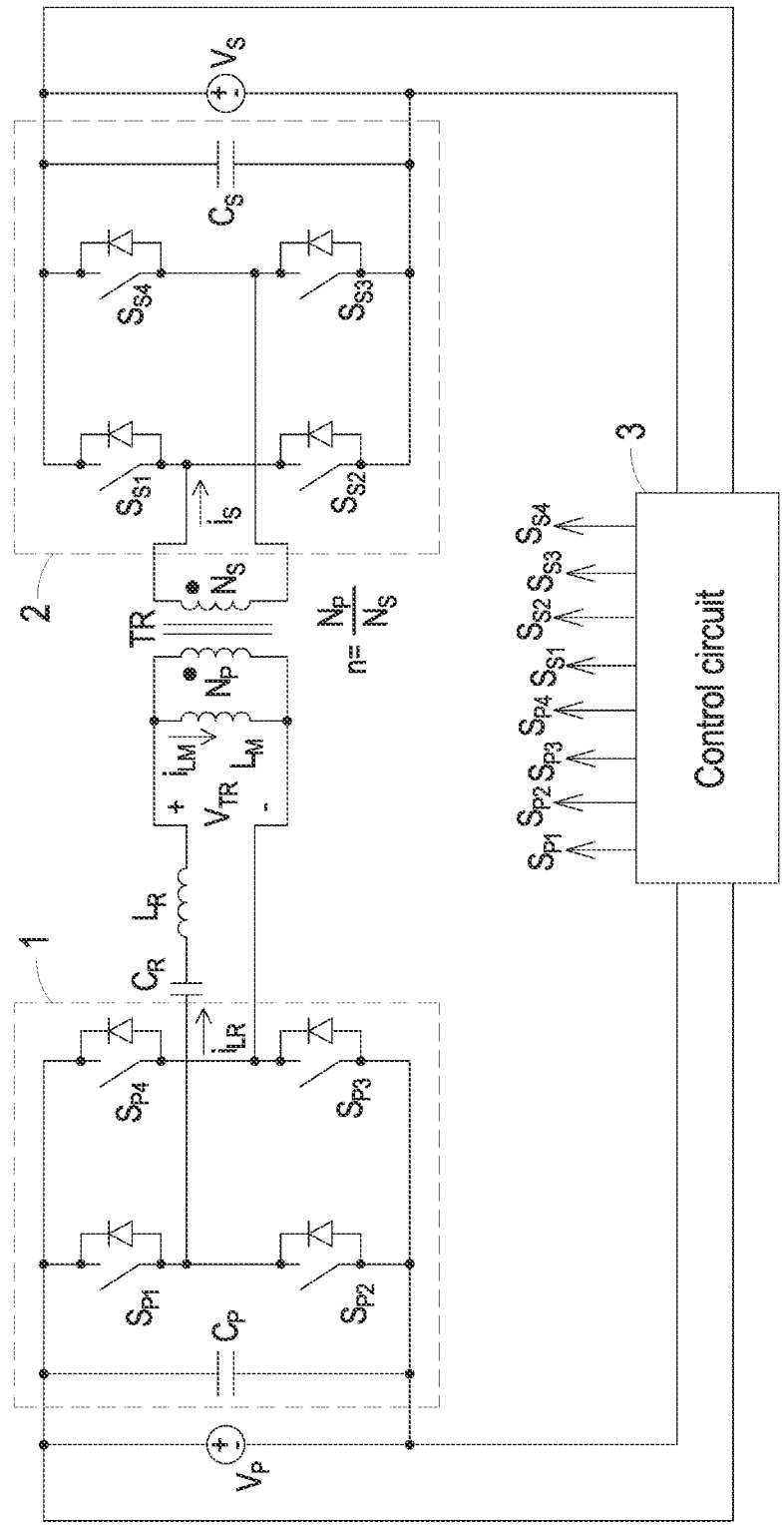
FIG. 2 is a schematic circuit diagram illustrating a power converter according to an embodiment of the present disclosure.

FIG. 2 is a schematic circuit diagram illustrating a power converter according to an embodiment of the present disclosure. As shown in FIG. 2, the power converter includes a primary side switching circuit 1, a secondary side switching circuit 2, a transformer TR, and a control circuit 3. The primary and secondary side switching circuits 1 and 2 include a first set of switches and a second set of switches respectively. The primary and secondary sides of the transformer TR are coupled to the primary and secondary side switching circuits 1 and 2 respectively, namely the transformer TR is coupled between the primary and secondary side switching circuits 1 and 2. The control circuit 3 is configured to control power transfer between the primary and secondary side switching circuits 1 and 2 by controlling the first and second sets of switches. The primary and secondary side switching circuits 1 and 2 may be implemented with one of full-bridge, half-bridge, forward, and flyback circuits. For example but not exclusively, the power converter is a unidirectional or bidirectional isolated DC/DC converter such as an isolated DC-DC converter, a dual active bridge (DAB) converter, a resonant converter or a phase-shifted full-bridge converter. If the power converter is a DAB converter, the power converter further includes an inductor coupled between the primary side switching circuit 1 and the transformer TR. In an embodiment, the first set of switches includes four primary-side switches $S_{P1}$, $S_{P2}$, $S_{P3}$, and $S_{P4}$, and the second set of switches includes four secondary-side switches $S_{S1}$, $S_{S2}$, $S_{S3}$, and $S_{S4}$. In one embodiment, the power converter is a multi-phase isolated DC-DC converter.

Taking the embodiment shown in FIG. 2 as an example, the power converter is a resonant converter including a resonant capacitor $C_R$ and a resonant inductor $L_R$ serially connected between the primary side switching circuit 1 and the transformer TR, and the resonant capacitor and inductor $C_R$ and $L_R$ form a resonant tank. In this embodiment, when the energy is delivered from the primary side to the secondary side of the transformer TR, the resonant capacitor $C_R$ can prevent saturation of the transformer TR by blocking any DC current. Whereas, when the energy is delivered from the secondary side to the primary side of the transformer TR, the DC current cannot be blocked since there is no blocking capacitor disposed at the secondary side of the transformer TR.

In an ideal operation during the time when energy is delivered from the secondary side to the primary side of the transformer TR, the secondary-side switches $S_{S1}$ and $S_{S2}$ operate with alternate gate pulses with a substantially 50% duty cycle and a switching period $T_S$. The secondary-side switches $S_{S3}$ and $S_{S4}$ operate with the same gate pulses as those of the secondary-side switches $S_{S1}$ and $S_{S2}$, respectively. Whereas, the primary-side switches $S_{P1}$, $S_{P2}$, $S_{P3}$, and SN operate only as synchronous rectifiers. That is, the primary-side switches $S_{P2}$ and $S_{P4}$ are turned-on when the resonant inductor current $i_{LR}$ on the resonant inductor $L_R$ is positive, and the primary-side switches $S_{P1}$ and $S_{P3}$ are turned on when the resonant inductor current $i_{LR}$ is negative. It should be noted that the primary-side voltage $V_P$ is regulated by varying the switching period $T_S$.

Figure 3:
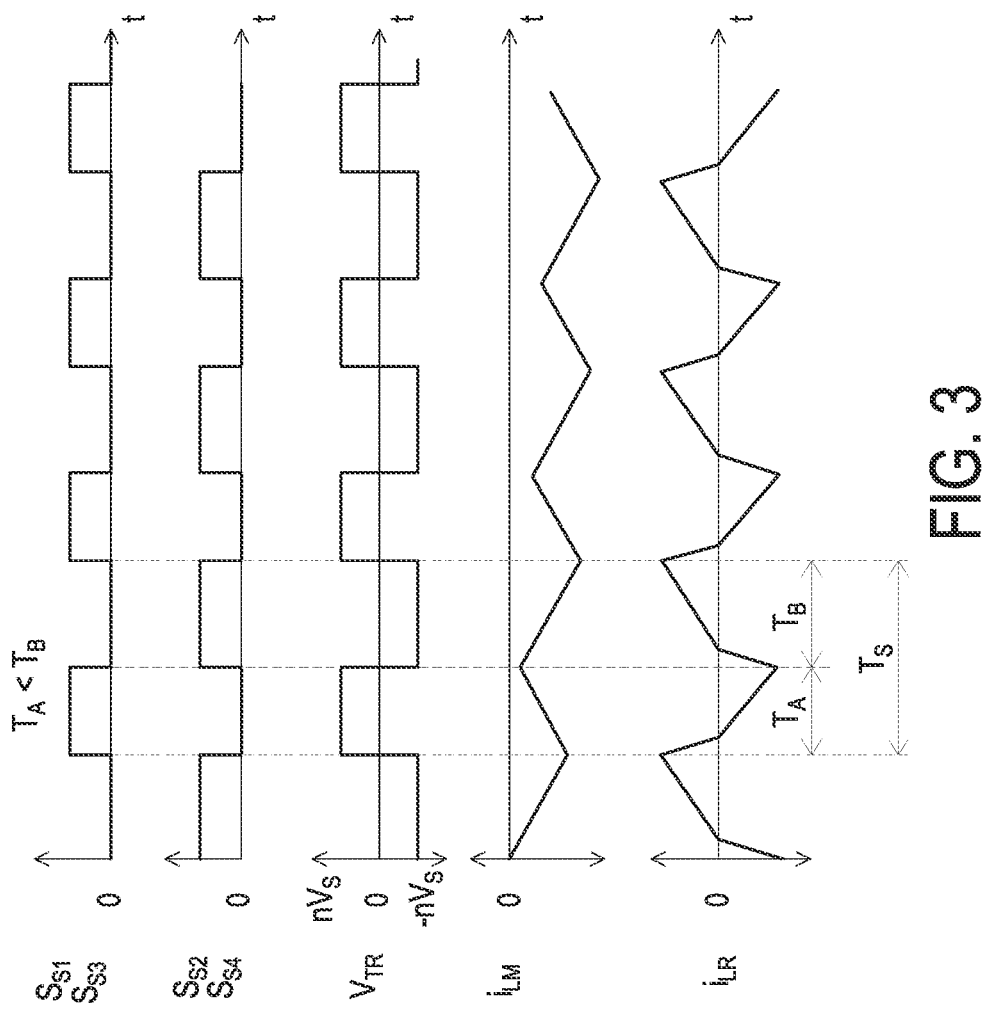
FIGS. 3 and 4 schematically show key waveforms of the power converter of FIG. 2 where the time period $T_A$ is shorter than the time period $T_B$.

In a non-ideal operation during the time when energy is delivered from the secondary side to the primary side of the transformer TR, the secondary-side switches $S_{S1}$ and $S_{S2}$ operate with alternate gate pulses with a duty cycle not equal to 50%. For example, as shown in FIG. 3, the time period $T_A$ of the secondary-side switches $S_{S1}$ and $S_{S3}$ being on is shorter than the time period $T_B$ of the secondary-side switches $S_{S2}$ and $S_{S4}$ being on. The uneven duty cycles of the secondary-side switches make the transformer voltage $V_{TR}$ across the transformer TR negative for a longer time in the switching period $T_S$ than positive. The difference between the positive and negative volt-seconds of the transformer voltage $V_{TR}$ during each switching period $T_S$ is accumulated over switching cycles and results in increasing the DC magnitude of magnetizing current $i_{LM}$. The relation between the DC magnitude of magnetizing current $i_{LM}$ and the transformer voltage $V_{TR}$ is shown in equation (1). If the DC magnitude of magnetizing current $i_{LM}$ exceeds the maximum allowable value set for the selected magnetic material, the transformer TR would saturate.

$$i_{LM} = \frac{1}{L_M} \int v_{TR} \cdot dt \qquad (1)$$

To prevent saturation of the transformer TR, the control circuit 3 is adapted to enable and disable the first and second sets of switches in an enabling duration and a disabling duration respectively and alternatively. Specifically, the first and second sets of switches are enabled to operate with alternate gate pulses in the enabling duration, and the first and second sets of switches are disabled to be off constantly in the disabling duration. Therefore, even though the DC magnitude of magnetizing current $i_{LM}$ may be increased incrementally during the enabling duration due to unequal time periods $T_A$ and $T_B$, the DC magnitude of magnetizing current $i_{LM}$ would be reset to substantially zero during the disabling duration. Consequently, saturation of the transformer TR is prevented without any additional blocking capacitor, sensor, sensing circuit or auxiliary winding. Usually, the enabling duration is much longer than the disabling duration so that the output regulation of the power converter would not be significantly interrupted by disabling the switches.

Figure 4:
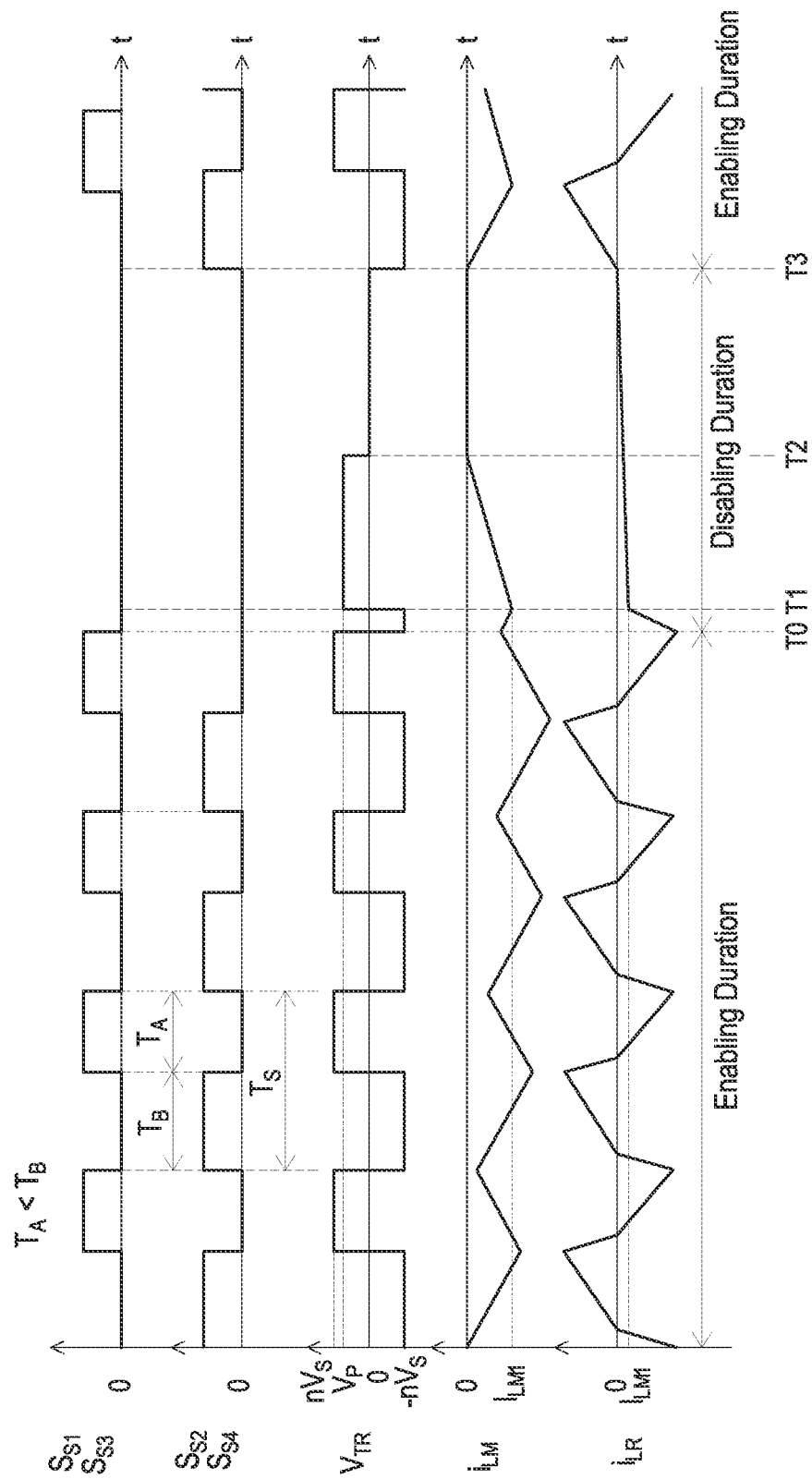
Figure 5A:
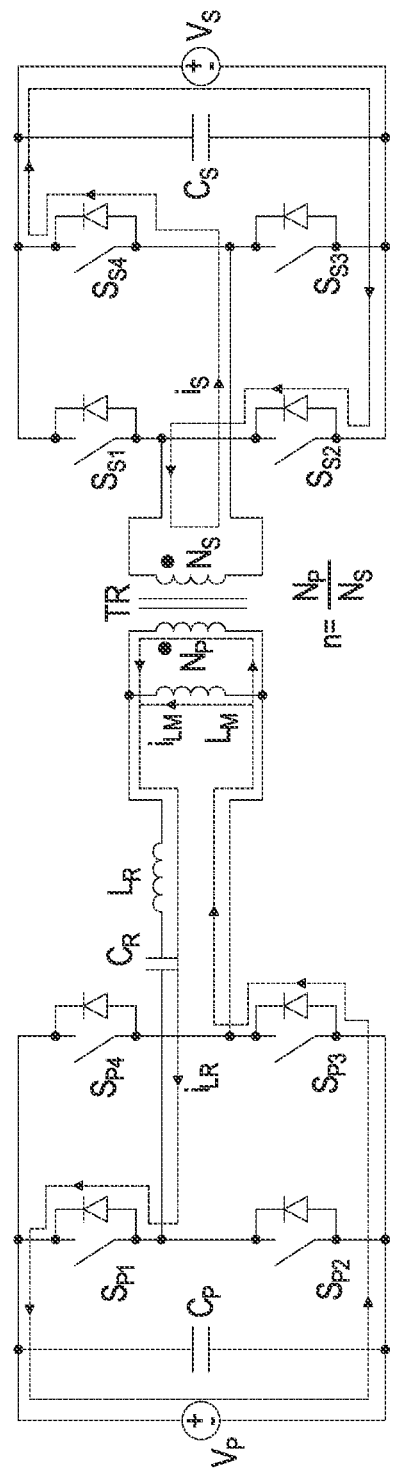
FIG. 5A is a circuit diagram of the power converter of FIG. 2 during the time interval $T_0$ to $T_1$.
Figure 5B:
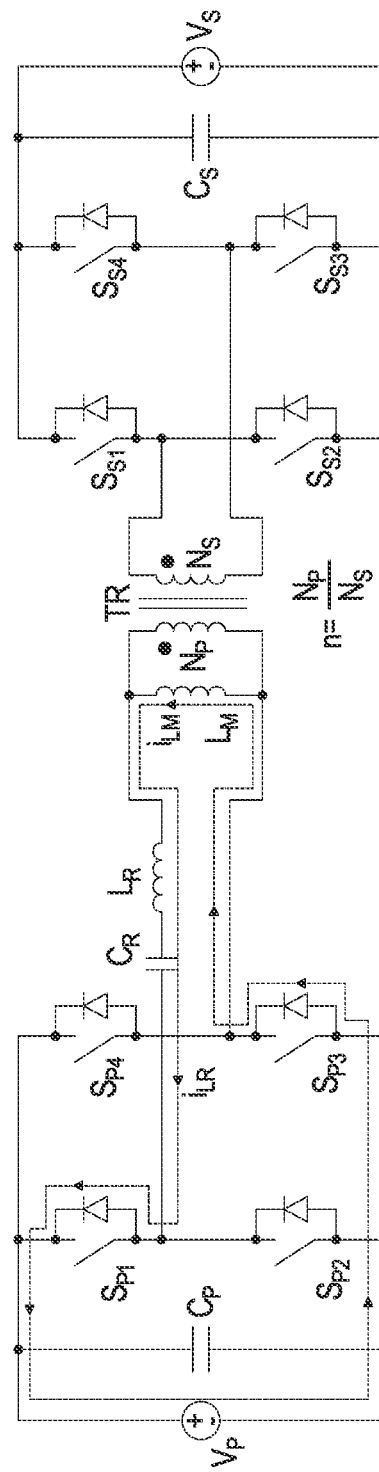
FIG. 5B is a circuit diagram of the power converter of FIG. 2 during the time interval $T_1$ to $T_2$.

The detailed operation process and the principle of resetting the DC magnitude of magnetizing current km are exemplified as follows with the help of FIGS. 4, 5A and 5B. As shown in FIG. 4, during the enabling duration, the DC magnitude of magnetizing current $i_{LM}$ incrementally increases over the switching periods $T_S$ due to uneven duty-cycles of the secondary-side switches. At the time $T_0$, as shown in FIG. 4 and FIG. 5A, all the switches are disabled, and both the resonant inductor current $i_{LR}$ and the secondary-side current is that equals $n*(i_{LR}-i_{LM})$ are negative, where n is the turns ratio of the transformer TR. Therefore, after the time $T_0$, the resonant inductor currents $i_{LR}$ flow through the body diodes of the primary-side switches $S_{P1}$ and Spa, and the secondary-side current $i_S$ flow through the body diodes of the secondary-side switches $S_{S2}$ and $S_{S4}$. As a result, during the time between the times $T_0$ and $T_1$, the voltage across the resonant tank equals $V_P + n \cdot V_S$, which makes both the resonant inductor current $i_{LR}$ and the secondary-side current is to increase rapidly. At the time $T_1$, the secondary-side current $i_S$ reaches zero, and the resonant inductor current $i_{LR}$ is equal to the magnetizing current $I_{LM1}$. It should be noted that the primary-side voltage $V_P$ is smaller than the primary reflected secondary-side voltage $n \cdot V_S$ in this particular example, i.e., $V_P < nV_S$. As a result, since the secondary-side current is equals zero at the time $T_1$, the body diodes of the secondary-side switches are reverse biased and stop conducting. After $t=T_1$, as shown in FIG. 4 and FIG. 5B, the DC magnitude of magnetizing current km continues to flow through the body diodes of the primary-side switches $S_{P1}$ and $S_{P3}$. During the time between the times $T_1$ and $T_2$, the voltage across the magnetizing inductor $L_M$ is approximately equal to the primary-side voltage $V_P$ that resets the DC magnitude of magnetizing current km to near zero. After the time $T_3$, all the switches are enabled again, and the power converter resumes its operation. Consequently, by alternately enabling and disabling the switches for certain number of switching cycles, saturation of the transformer TR can be prevented.

In an embodiment, the time of the enabling duration is determined by at least one of a maximum magnetizing current and the expected differences of uneven duty-cycles of the switches. In the embodiment, the maximum magnetizing current is the maximum allowable magnetizing current. In one embodiment, the time of the enabling duration is determined by the maximum magnetizing current and the expected differences of uneven duty-cycles of the switches.

In an embodiment, the time of the disabling duration is determined by at least one of the maximum magnetizing current and a magnitude of a voltage that resets the magnetizing current. Preferably but not exclusively, the time of the enabling and disabling durations are both multiple times of the switching period $T_S$. In the embodiment, the maximum magnetizing current is the maximum allowable magnetizing current. In one embodiment, the time of the disabling duration is determined by the maximum magnetizing current and the magnitude of the voltage that resets the magnetizing current.

Figure 6:
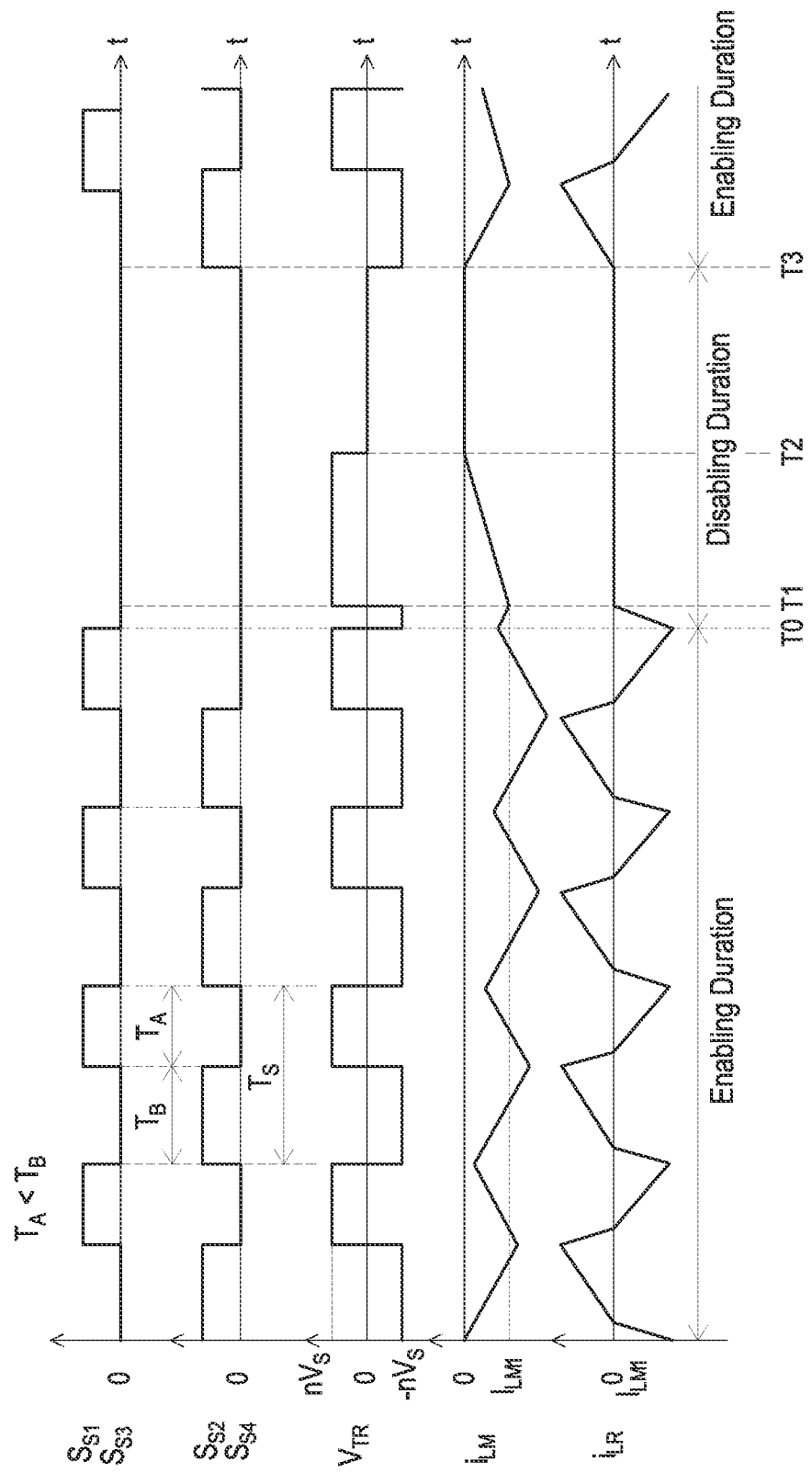
FIG. 6 schematically shows key waveforms of the power converter of FIG. 2 where the time period $T_A$ is shorter than the time period $T_B$ in the case that the primary-side voltage $V_P$ is greater than n·$V_S$.

When the primary-side voltage $V_P$ is greater than $n \cdot V_S$, the operation to reset the DC magnitude of magnetizing current $i_{LM}$ is similar to that of the case that $n \cdot V_S$ is greater than the primary-side voltage $V_P$. Exceptionally, in the case that the primary-side voltage $V_P$ is greater than $n \cdot V_S$, as shown in FIG. 6, the resonant inductor current $i_{LR}$ reaches zero at the time $T_1$, and the secondary-side current $i_S$ and the DC magnitude of magnetizing current $i_{LM}$ reach zero at the time $T_2$. Accordingly, after the time $T_1$, the body diodes of the primary-side switches are reverse biased and stop conducting. During the time between $t=T_1$ and $t=T_2$, the DC magnitude of magnetizing current $i_{LM}$ flows through the body diodes of the secondary-side switches $S_{S1}$ and $S_{S3}$. As a result, the voltage across the magnetizing inductor $L_M$ is equal to $n \cdot V_S$ that resets the DC magnitude of magnetizing current $i_{LM}$ to near zero at the time $T_2$.

Figure 7:
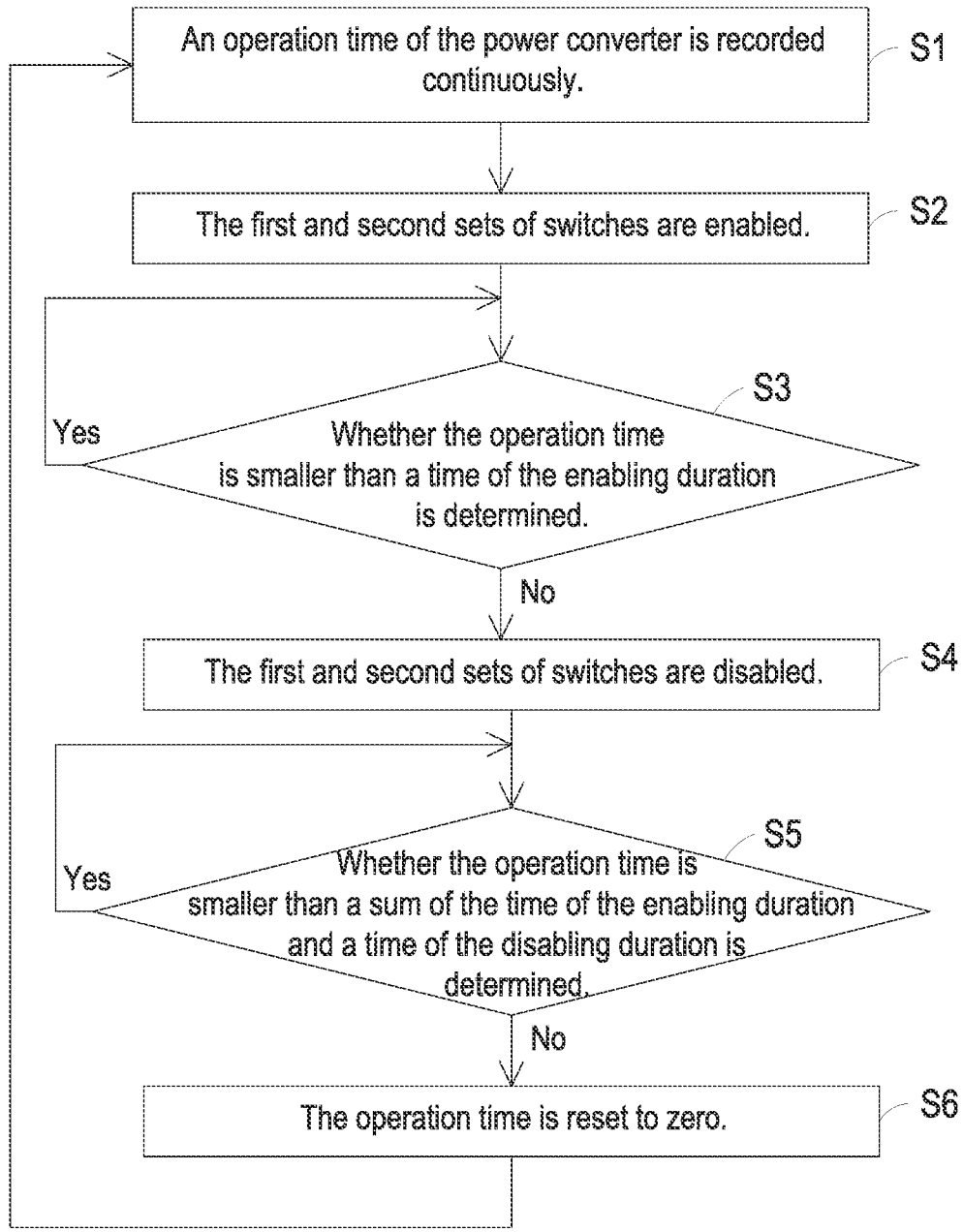
FIG. 7 is a schematic flowchart illustrating a control method of a power converter according to an embodiment of the present disclosure.

FIG. 7 is a schematic flowchart illustrating a control method of a power converter according to an embodiment of the present disclosure. The control method is applied to the power converter described above. As shown in FIG. 7, the control method includes the following steps.

First, in the step S1, an operation time of the power converter is recorded continuously. Then, in the step S2, the first and second sets of switches are enabled. In specific, the first and second sets of switches are enabled to operate with alternate gate pulses. Afterward, in the step S3, whether the operation time is smaller than a time of the enabling duration is determined. If the determining result of the step S3 is satisfied, the step S3 is performed again. If the determining result of the step S3 is not satisfied, the first and second sets of switches are disabled (see step S4). Then, in the step S5, whether the operation time is smaller than a sum of the time of the enabling duration and a time of the disabling duration is determined. If the determining result of the step S5 is satisfied, the step S5 is performed again. If the determining result of the step S5 is not satisfied, the operation time is reset to zero (see step S6), and the step S1 is performed.

Consequently, the control method disables the switches intermittently for preventing saturation of the transformer TR, and the control method can be implemented by simply recording the operation time and enabling or disabling the switches according to the relations among the operation time, the enabling duration and the disabling duration. The control method of the embodiment is adapted to perform a sensor-less control. Since saturation of the transformer of isolated converters may be prevented without using any additional blocking capacitor, sensor, sensing circuit or auxiliary winding, the control method is suitable for applications that require isolation transformers.

Figure 8:
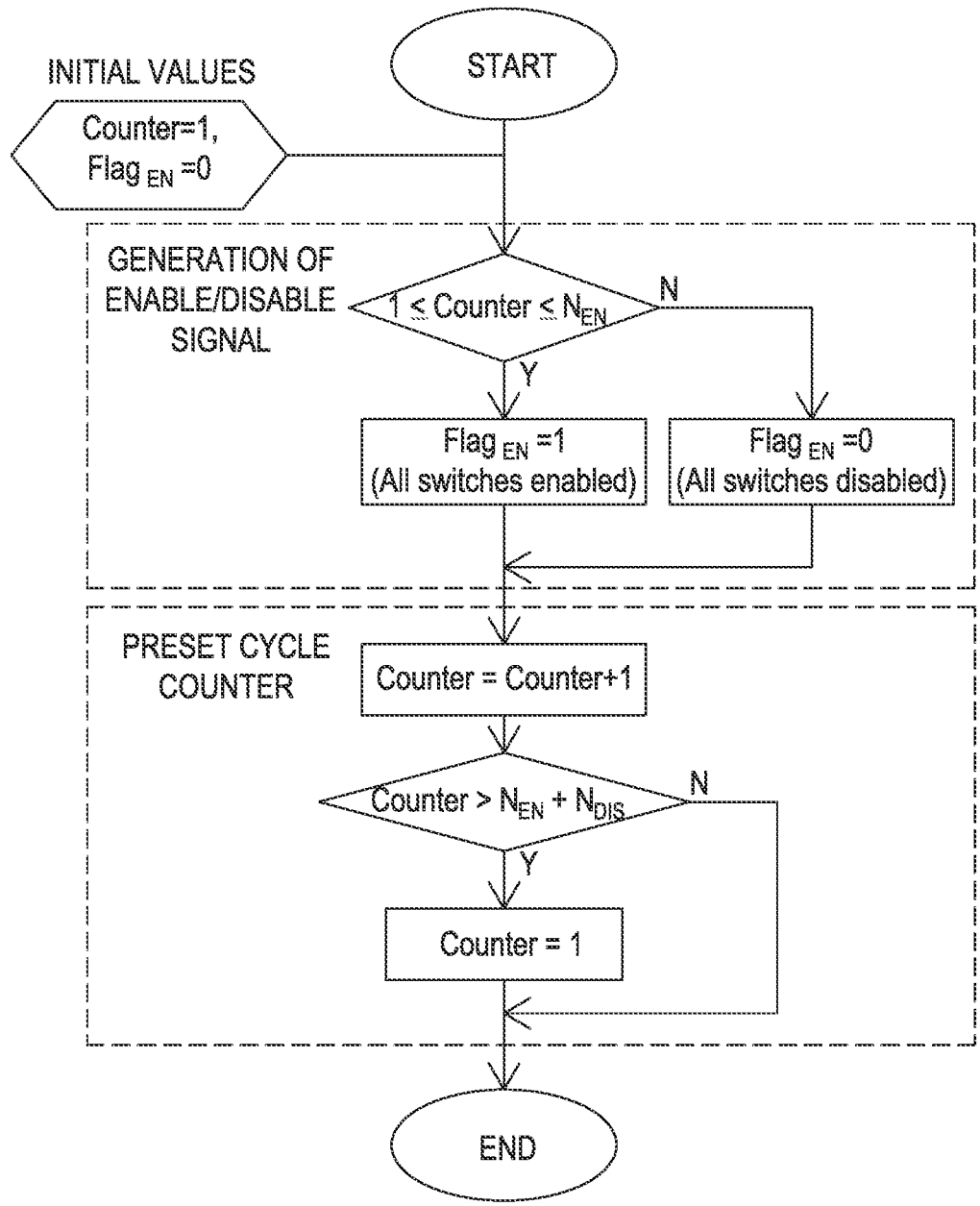
FIG. 8 is a schematic flowchart illustrating a control method of a power converter according to another embodiment of the present disclosure.
Figure 9:
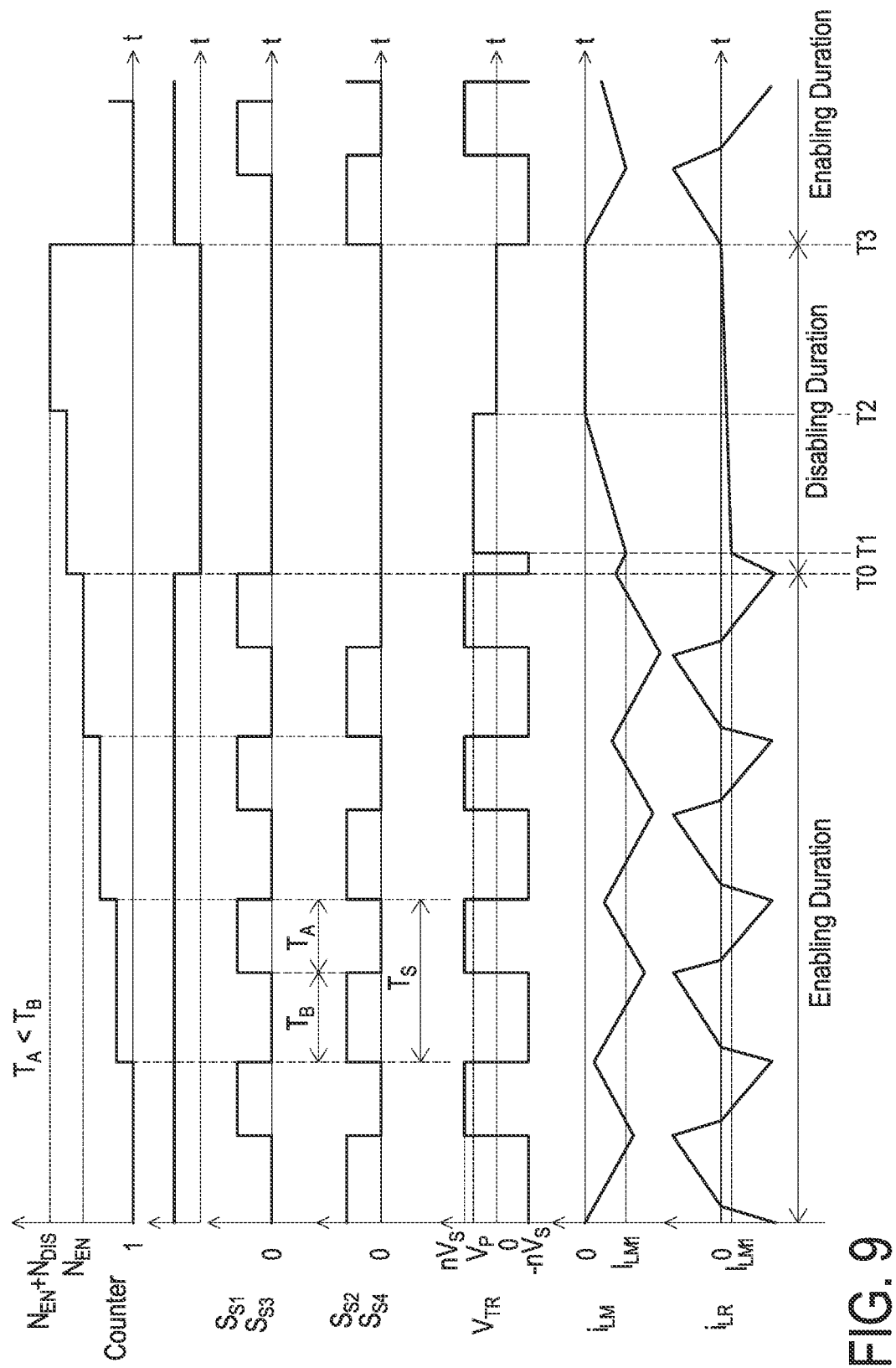
FIG. 9 schematically shows key waveforms of the power converter in which the steps shown in FIG. 8 are applied.

FIG. 8 is a schematic flowchart illustrating a control method of a power converter according to another embodiment of the present disclosure. The control method is applied to the power converter described above and is implemented by a counter capable of counting switching cycles. The counter is utilized to record the operation time by counting the number of passed preset cycles starting from 1. Corresponding to the same application situation shown in FIG. 4, the specific oscillogram in this embodiment is shown in FIG. 9. In FIG. 9, the preset cycle is exemplified to be equal to the switching cycle, but the preset cycle in the control method shown in FIG. 8 is not limited thereto. Please refer to FIG. 8 with FIG. 9. Started from the beginning that the counter equals 1 and the signal Flag$_{EN}$=0, the flowchart shown in FIG. 8 is repeated with an interval of one preset cycle. It should be noted that N$_{EN}$ is the number of preset cycles during the enabling duration, and N$_{DIS}$ is the number of preset cycles during the disabling duration. First, whether 1≤counter≤N$_{EN}$ is determined. All switches are enabled for one preset cycle if the determining result is satisfied, and all switches are disabled for one preset cycle if the determining result is not satisfied. Then, the counter is increased by 1. Then, whether counter>N$_{EN}$+N$_{DIS}$ is determined. If the determining result is satisfied, the counter is reset to 1. In conclusion, when 1≤counter≤N$_{EN}$, all switches are enabled so that the converter operates normally, i.e., signal Flag$_{EN}$=1. When N$_{EN}$<counter≤N$_{EN}$+N$_{DIS}$, all switches are disabled for resetting the DC magnitude of magnetizing current to zero, i.e., signal Flag$_{EN}$=0. When counter>N$_{EN}$+N$_{DIS}$, the counter is reset to 1, which means that the operation time is reset to zero, and the whole operation repeats again.

From the above descriptions, the present disclosure provides a power converter and a control method thereof to prevent saturation of a transformer in the power converter. The switches of the power converter are enabled and disabled in an enabling duration and a disabling duration respectively and alternatively. Accordingly, a DC magnitude of magnetizing current of the transformer is reset to zero substantially during the disabling duration. Consequently, saturation of the transformer can be prevented without any additional blocking capacitor, sensor, sensing circuit or auxiliary winding.

While the disclosure has been described in terms of what is presently considered to be the most practical and preferred embodiments, it is to be understood that the disclosure needs not be limited to the disclosed embodiment.

What is claimed is:

1. A power converter, comprising:
a primary side switching circuit comprising a first set of switches;
a secondary side switching circuit comprising a second set of switches;
a transformer coupled between the primary side switching circuit and the secondary side switching circuit; and
a control circuit configured to control power transfer between the primary side switching circuit and the secondary side switching circuit by controlling the first and second sets of switches, wherein the control circuit is adapted to enable the first and second sets of switches in an enabling duration and disable the first and second sets of switches in a disabling duration, wherein the enabling duration and the disabling duration are operated respectively and alternatively, wherein the control circuit is configured to perform a control method comprising steps of:

(a) recording an operation time of the power converter continuously;

(b) enabling the first and second sets of switches;

(c) determining whether the operation time is smaller than a time of the enabling duration, wherein in the enabling duration, the first and second sets of switches are enabled to operate with alternate gate pulses and a switching period, and wherein the enabling duration is longer than the disabling duration;

(d) performing the step (c) again if the determining result of the step (c) is satisfied, and disabling the first and second sets of switches if the determining result of the step (c) is not satisfied;

(e) determining whether the operation time is smaller than a sum of the time of the enabling duration and a time of the disabling duration; and (f) performing the step (e) again if the determining result of the step (e) is satisfied, and resetting the operation time to zero and performing the step (a) if the determining result of the step (e) is not satisfied, wherein the first and second sets of switches are disabled to be off constantly in the disabling duration, and the time of the disabling duration is determined by at least one of a maximum magnetizing current and a magnitude of a voltage that resets a magnetizing current or the maximum magnetizing current.

2. The power converter according to claim 1, wherein in the enabling duration, the first and second sets of switches are enabled to operate with the alternate gate pulses with approximately 50% duty cycle.

3. The power converter according to claim 2, wherein a time of the enabling and disabling durations is a multiple of the switching period of the first and second sets of switches.

4. The power converter according to claim 1, further comprising a counter configured to record time, and the control circuit controls the first and second sets of switches according to the time recorded by the counter.

5. The power converter according to claim 1, wherein the time of the enabling duration is determined by at least one of the maximum magnetizing current and differences of uneven duty-cycles of the first and second sets of switches.

6. The power converter according to claim 1, wherein the power converter is a resonant converter and further comprises a resonant tank coupled between the primary side switching circuit and the transformer, and the resonant tank comprises a resonant capacitor and a resonant inductor connected in series.

7. The power converter according to claim 1, wherein the power converter is a dual active bridge converter and further comprises an inductor coupled between the primary side switching circuit and the transformer.

8. The power converter according to claim 1, wherein the power converter is a unidirectional or bidirectional isolated DC-DC converter.

9. The power converter according to claim 1, wherein the power converter is a multi-phase isolated DC-DC converter.

10. The power converter according to claim 1, wherein the control method is configured to perform a sensor-less control.

11. The power converter according to claim 1, wherein the control method is for preventing saturation of the transformer.

* * * * *